Figure 1:
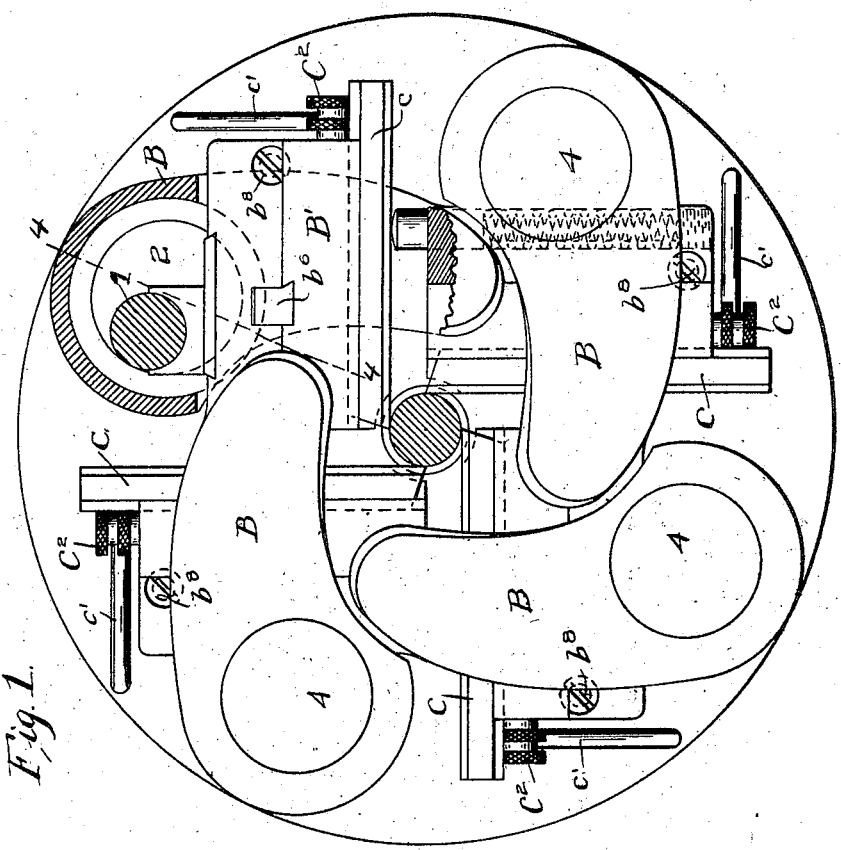

A. B. LANDIS.
CUTTER HEAD.
APPLICATION FILED MAY 18, 1910.

1,017,892.

Patented Feb. 20, 1912.

5 SHEETS—SHEET 1.

Witnesses
L. A. Price.
E. L. Reichenbach.

Inventor
Abraham B. Landis
By A. W. Bradford
Attorney

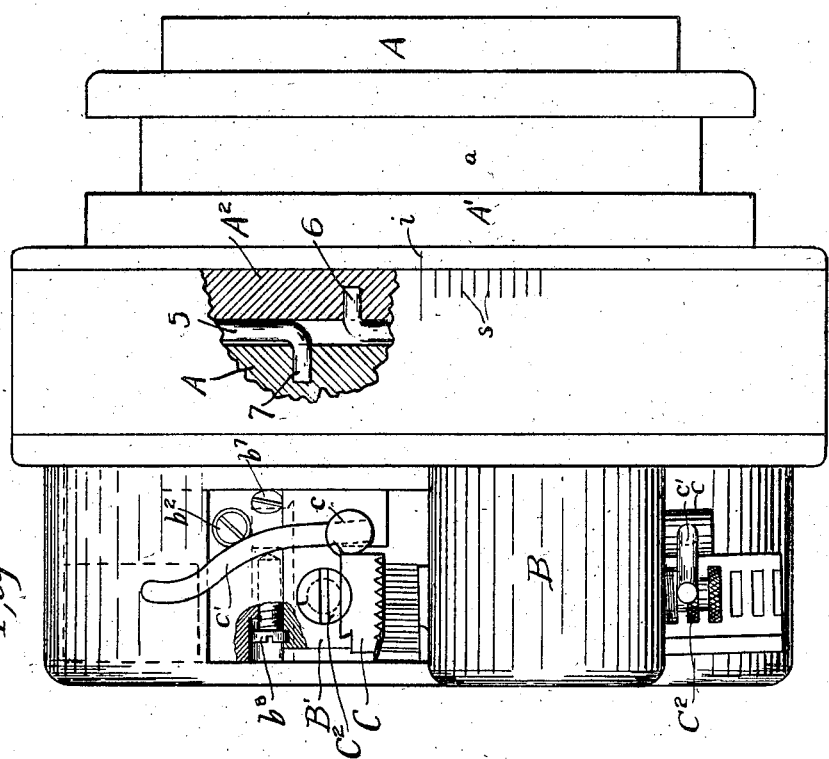
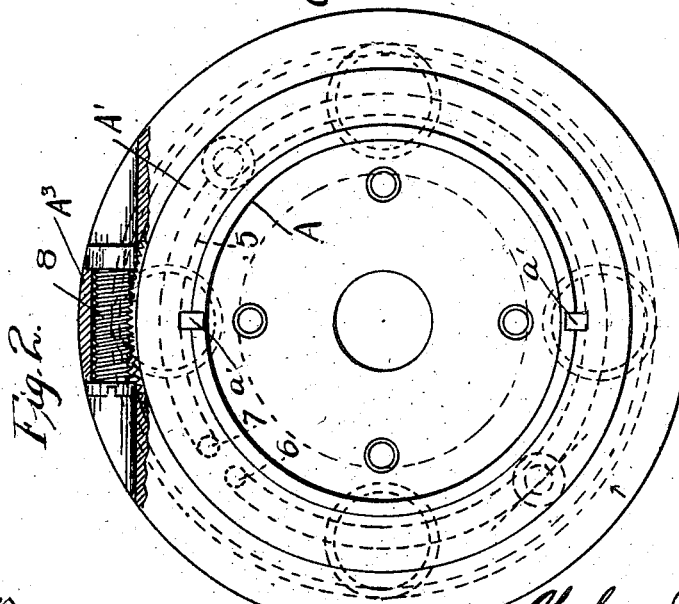

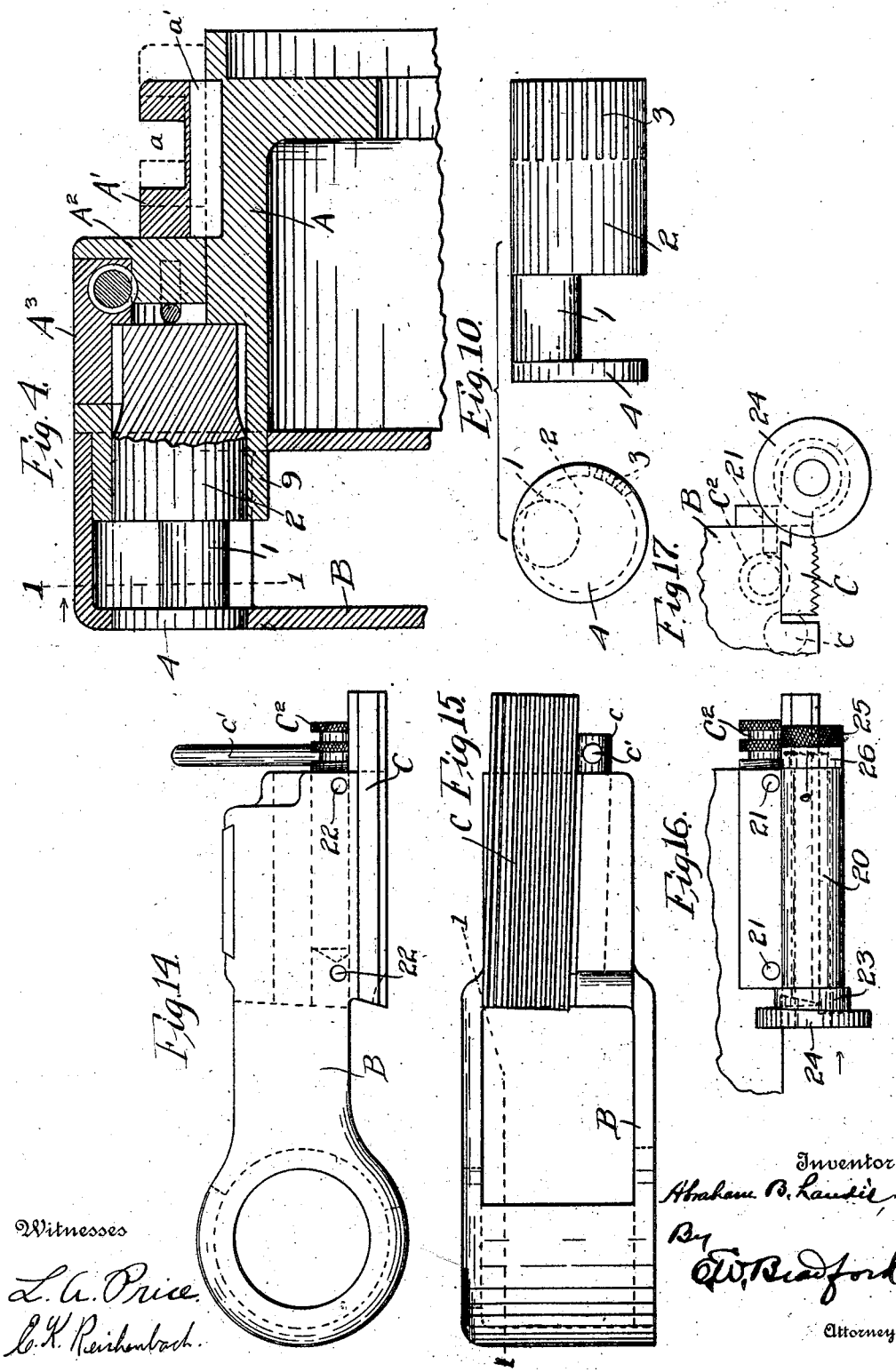

A. B. LANDIS.
CUTTER HEAD.
APPLICATION FILED MAY 18, 1910.
1,017,892.
Patented Feb. 20, 1912.
5 SHEETS—SHEET 4.
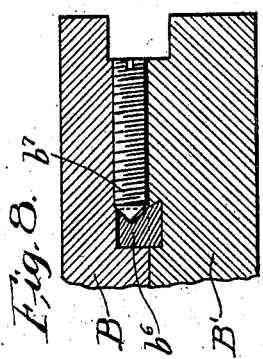
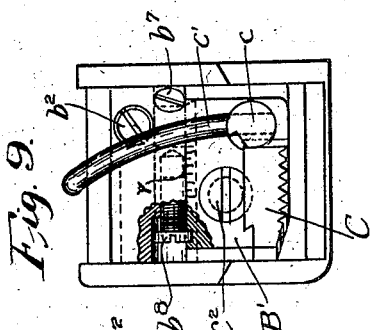
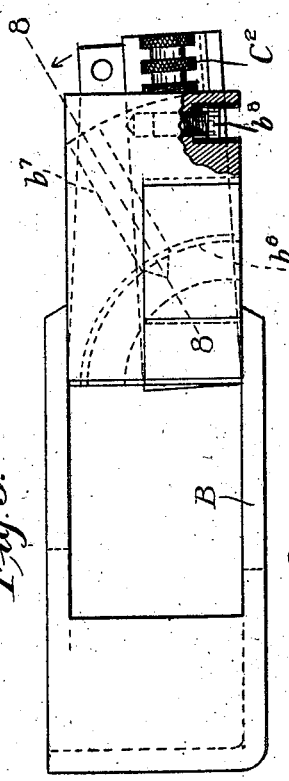
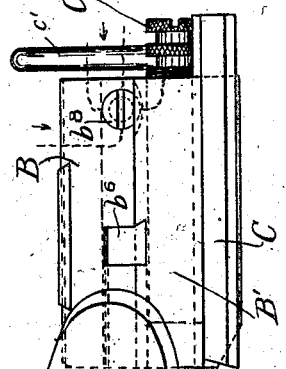
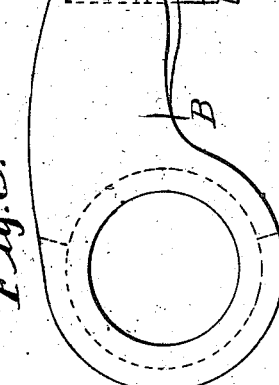
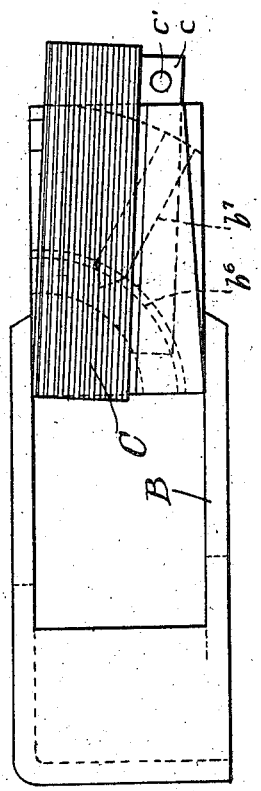

A. B. LANDIS.
CUTTER HEAD.
APPLICATION FILED MAY 18, 1910.
1,017,892.
Patented Feb. 20, 1912.
5 SHEETS—SHEET 5.
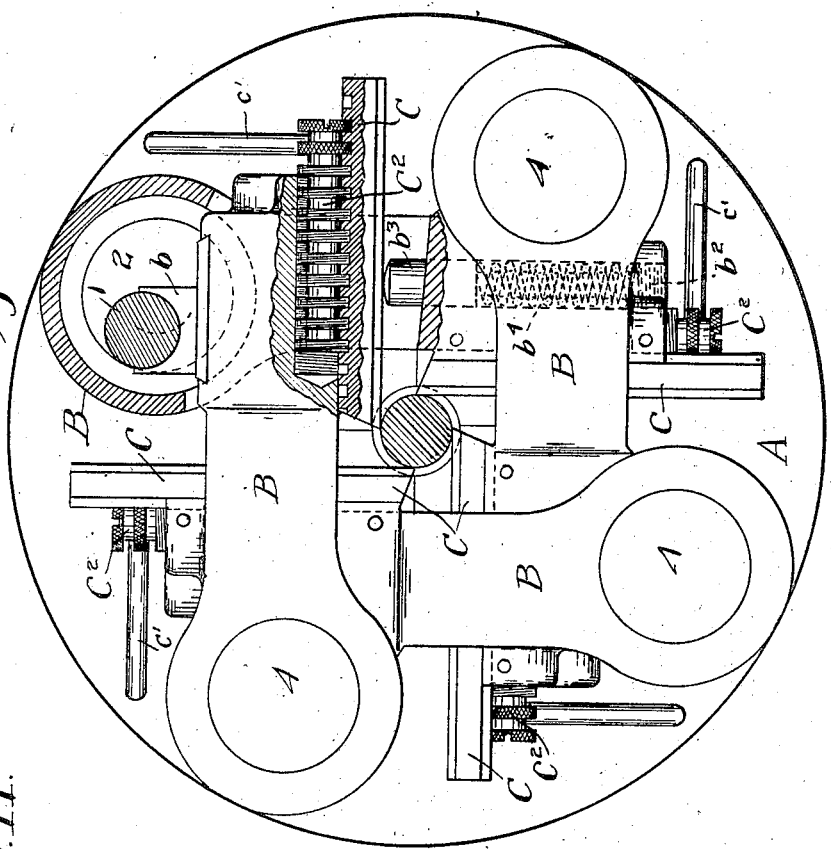
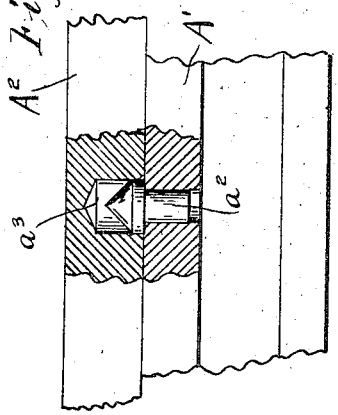
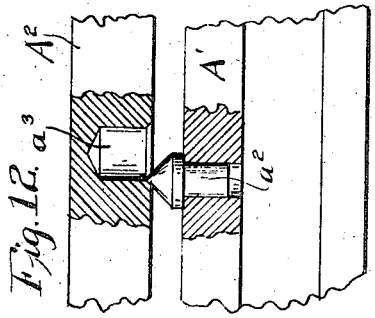
Witnesses
L. A. Price.
C. K. Reichenbach.
Inventor
Abraham B. Landis
By C. W. Bradford
Attorney

UNITED STATES PATENT OFFICE.

ABRAHAM B. LANDIS, OF WAYNESBORO, PENNSYLVANIA.

CUTTER-HEAD.

1,017,892.

Specification of Letters Patent. Patented Feb. 20, 1912.

Application filed May 18, 1910. Serial No. 562,017.

*To all whom it may concern:*

Be it known that I, ABRAHAM B. LANDIS, a citizen of the United States, residing at Waynesboro, in the county of Franklin and State of Pennsylvania, have invented certain new and useful Improvements in Cutter-Heads, of which the following is a specification.

My said invention consists in various improvements in the details of construction of cutter-heads for use on bolt-cutting machines, whereby such a head is provided in which the cutter-holders are supported in a rigid manner and adapted to be quickly and easily operated to open and close the die, and the head as a whole is made comparatively short and compact, and the angle of the cutter may be readily adjusted to cut any pitch of thread required, all as will be hereinafter more fully described and claimed.

Referring to the accompanying drawings which are made a part hereof and on which similar reference characters indicate similar parts, Figure 1 is a face view, or front elevation, of a cutter-head embodying my said invention, Fig. 2 a rear elevation with one edge broken away showing a feature of internal construction more clearly, Fig. 3 a side elevation with one portion of the casing broken away to show a feature of internal construction more clearly, Fig. 4 a detail longitudinal section on the dotted line 4—4 in Fig. 1, Fig. 5 an outside view of one of the cutter-holders, Fig. 6 a side elevation of one of the same, Fig. 7 an underside plan of the same, Fig. 8 a detail section on the dotted line 8—8 in Fig. 5, Fig. 9 an end elevation, Fig. 10 an end and side elevation of one of the securing and adjusting cylinders, Figs. 11 and 12 details illustrating the locking means, Figs. 13, 14 and 15 views similar to Figs. 1, 6 and 7 illustrating a modified form, Fig. 16 a side elevation of one end of a cutter-holder showing a cutter adjusting gage thereon, and Fig. 17 an end elevation of the same.

In said drawings the portions marked A represent the body, B the cutter-holders and C the cutters.

The body A is a casting of suitable dimensions formed with a hollow interior and having bearings around its outer edge in which are mounted cylinders 2 formed with eccentric bearings 1 near their outer ends and with a toothed section 3 at their inner ends. The extreme outer ends 4 are concentric with the main body 2, as most clearly indicated in Figs. 4 and 9. On the rear end of the body is mounted a sliding ring A' formed with a circumferential groove $a$ with which a shifting fork (not shown) may engage for adjusting the same back and forth in the usual manner. Said collar is secured on the rear end of said body by means of a spline $a'$. A ring $A^2$ is mounted on said body adjacent to the collar A' and is secured thereto by a pin $a^2$ seated in a perforation in said collar A' and formed with a conical outer end, (see Figs. 11 and 12) which is adapted to engage with a perforation $a^3$ in said ring $A^2$. For a short distance adjoining the face of collar A' said pin is formed with straight sides, the taper of its conical point starting a short distance from said face, so that when the parts are in the engagement shown in Fig. 11 the straight portion of the pin will engage with the straight sides of the perforation $a^3$ and hold the parts locked together. A coiled spring 5 engages at one end, 6, with a perforation in the ring $A^2$ extending entirely around the body and its other end, 7, engages with a perforation in the adjacent end of the body A, the tension of the spring being such as to operate to turn ring $A^2$ a short distance independent of said body. Another ring $A^3$ is mounted on said body with its rear portion overlapping a shoulder in the ring $A^2$ and its forward portion being formed with internal teeth which engage the gear teeth 3 of the several cylinders 2. A screw 8 is mounted in a tangential socket in one side of said ring $A^3$ with its threads engaging with a worm-gear in the periphery of the shoulder of the ring $A^2$, thus securing said rings $A^2$ and $A^3$ together but providing a means for a circumferential adjustment of one in relation to the other.

The cutter-holders B comprise arms of a form best illustrated in Figs. 5, 6 and 7 one end being formed with a hub having a perforation which is adapted to fit over the outer end, 4, of one of the cylinders 2 and the inner end of which fits over a stud-bearing 9, formed for the purpose on the face of the body A. Said bearings 9 are located equi-distant around the axis of said body and are formed hollow, the cylinders 2 being mounted within said bearings. Said holders B are of sufficient length to extend across the head, as best shown in Fig. 1, and each is formed with an aperture at right angles with the axis of its pivot and adjacent to the hub or bearing on which it is mounted. The outer end of each holder is narrowed in width sufficiently to extend through the aperture of the holder which extends across the head at right angles thereto and on the opposite side thereof. Thus the four holders B, as shown in Fig. 1, are all inter-locked the outer end of each one extending through the aperture in the opposite holder adjacent to the bearing thereof. Each of said holders is formed on its inner face near its outer end with a seat in which is mounted a block B' containing a seat for its cutter. Said blocks B' are secured to the main part of the cutter-holder D by means of a key $b^6$ in the form of a segment of a circle, which is mounted in a corresponding segmental groove in the adjacent face of each of the parts B and B', as shown most clearly in Figs. 5, 6 and 8. The groove and the key are each formed on a circle the center of which is the point of finish of the cut, or the final point of cutting between the cutter and the work, by reason of which the angle of said cutter may be shifted (with said point as the turning point) without throwing the die out of adjustment. The groove in the block B' is formed with a tapered or cut-under outer edge with which a tapered flange on the lower front corner of the key $b^6$ engages. The groove in the holder B is somewhat deeper than the width of key $b^6$ and said key is formed with a conical seat in its outer edge with which the point of a conical pointed screw $b^7$ is adapted to engage, the screw being mounted in the part B and its conical point adapted to bear against the outer angle, or face, of the conical seat in said key and force the same outwardly into the groove. The forcing of said screw against said tapered face will operate, therefore, to force said key outwardly and draw the block B' with it, clamping said block tightly against the adjacent face of the part B. Said block is secured and adjusted transversely by a set screw $b^8$ mounted in a transverse perforation in the holder B, the head of said screw being adapted to engage with a groove in the outer face of the block B' near its extreme outer end. A scale is preferably formed on the end of block B' and an indicator mark $v$ on the adjacent part B to determine the degree of angle and adjustment. By this means, as will be readily seen, the block B' may be adjusted to any angle desired in relation to the axis of the cutter-head by loosening the clamping screw $b^7$ and adjusting the securing screw $b^8$, as just described, and a single cutter-holder is thus adapted to hold a cutter to secure any pitch of thread desired, instead of requiring a change of holders as in other constructions of heads in common use.

Each of the cutters C is of a form illustrated in applications heretofore filed by me (for example, #544,089 filed February 4, 1910) and are mounted in the seats in the blocks B' by an inter-locking flange and groove at the outer corner of said block and cutter, respectively, and a cam cylinder $c$ mounted in a perforation in said block alongside the inner edge of said cutter, said cylinder being provided with a handle $c'$ for turning the same to clamp said cutter in position, or the cylinder may be formed to be operated by a screw-driver, as shown in my application No. 554,775.

In adjusting the die for different sizes of work the ring $A^3$ is turned on ring $A^2$ by means of a screw 8 until the adjustment desired is secured which may be determined by a scale $s$ on the periphery of said ring $A^3$ and an indicator mark $i$ on the adjacent periphery of the ring $A^2$. The turning of said ring $A^3$ operates through the gear connection with the cylinders 2 to turn said cylinders the eccentric bearings of which engage with bearing blocks $b$ on the outer ends of the adjacent cutter-holders and serve to furnish a support for said ends and a means for adjusting them out and in. As the ring $A^3$ turns, the cutter-holders B are rocked on the bearings consisting of the stud-bearing 9 on the body and the outer end, 4, of the cylinders 2 swinging the opposite ends of said cutter-holders around the axis of said pivots to open and close the die.

The cutters are mounted, as best shown in Figs. 1, 6 and 13, with the cutting end extending toward the pivoted end of the holders. The outer ends of the cutters extend beyond the outer ends of said holders and are adapted to be adjusted longitudinally and held against end thrust by screw-threaded rings on a screw $C^2$ which engage with transverse grooves in the back of the cutter and with screw-threads in a longitudinal seat in the holders B which cut into the seat for said cutter in the same manner (see especially Fig. 13) as shown and described in other applications heretofore filed by me.

A longitudinal perforation is formed in each cutter-holder extending from its outer end into the aperture adjacent to its hub the outer end of which is filled with a screw-plug $b^2$ and the inner end of which is provided with a plunger $b^3$, a coiled spring $b^4$ being interposed between said plunger and said screw-plug which normally presses said plunger against the face of the adjacent cutter and thus tends to force said cutter and the cutter-holder carrying it outward to keep the bearing-plug $b$ pressed into engagement with the eccentric bearing 1 of the cylinder 2. Thus, immediately upon the turning of said cylinders 2 to carry said eccentric bearings outward the spring $b^4$ will expand, forcing the cutter-holders outward on their pivots to open the die, while the turning or said cylinders in the reverse direction operates to return the cutter-holders to the position they occupy when the die is closed, compressing the springs $b^4$. Thus, while the cutter-holders are at all times held under a fixed and rigid support they are held by spring pressure against said supports and no vibration or rattle is thus permitted, the parts being held in closed relation at all times. By the swinging of the cutter-holders outwardly to adjust the die for different sizes of work, the points of the cutters will be varied in relation to the axis of the head and their longitudinal adjustment will be necessary in order to secure the best results. For this purpose I have designed a gage consisting of a casing, or frame, 20 provided with lugs, or pins, 21 which are adapted to be inserted in perforations 22 in the side of the cutter-holder B alongside the edge of the cutters C. In said casing 20 is mounted a cylinder 23 the outer end of which is formed with a flange 24 the inner face of said flange being adapted to extend across the front end of the point of the cutter-holder and formed spirally tapered. On the rear end said cylinder is provided with a knurled nut 25 with a scale 26 alongside its knurled portion and an indicator point $o$ on the casing alongside of said scale. By turning cylinder 23, as determined by the scale and indicator, the inner face of flange 24 may be set to determine the position of the cutting points of the cutters for any size of work desired. The cutters are set to the position thus determined by turning the screw $C^2$ in the well known manner. In changing from work of one pitch to work of another pitch the angle of the cutter may be adjusted as required by the means above described.

In operation, the parts being in operative position, as shown in Figs. 1 and 3, when the cutting reaches the limit of the movement, the collar A' is slid automatically by the automatic operating mechanism of the machine (not shown) to release the locking pins $a^2$ in the collar A' from engagement with the socket $a^3$ in the ring $A^2$. As soon as the parts are disengaged spring 5 expands to turn ring $A^3$, which, through its engagement with the cylinders 2 turn the cylinders carrying the eccentric bearings 1 outward and permitting the springs $b^4$ to expand and open the die. When the work is ready to be resumed the die is again closed by the automatic mechanism (not shown) and the operation repeated.

The modified form shown in Figs. 13, 14 and 15 is essentially the same as shown in the principal views except the cutter is mounted in a seat in the holder without any angular adjusting block B'.

Having thus fully described my said invention, what I claim as new and desire to secure by Letters Patent, is:

1. A cutter-head comprising a body having journals for the cutter-holders arranged around its axis, cutter-holders comprising arms adapted to extend across the face of the head mounted on said journals at one end and carrying the cutters on the inner face of their opposite ends, said cutters being arranged with their cutting points adjacent to the axis of the head, and means for opening and closing the die, substantially as set forth.

2. A cutter-head comprising a body, cutter-holders pivoted on said body, each cutter-holder being pivoted at one side of said body and extending across the face thereof to the opposite side, means for supporting and adjusting said ends, cutters mounted on the inner face of said outer ends with their cutting points adjacent to the axis of the head, and means for opening and closing the die, substantially as set forth.

3. A cutter-head comprising a body, cutter-holders each of which is pivoted at one end on one side of the head and of a length to extend across the axis of said head to near the opposite side thereof, the outer or swinging end of each cutter-holder extending through a transverse aperture formed adjacent to the pivot in the opposite holder, means for supporting and adjusting said outer ends, cutters carried on the inner face of said outer ends, and means for opening and closing the die, substantially as set forth.

4. A cutter-head comprising a body, cutter-holders each of which is pivoted at one end on one side of said body, each cutter-holder being formed to extend across the axis of the head and swing on its pivot and also with a transverse aperture adjacent to its pivot the outer end of each holder being mounted to extend through, said aperture in the opposite holder, means for supporting and adjusting the outer ends of said cutter-holders, means for swinging said outer ends to open and close the die, and cutters carried on the inner face of said outer ends with their cutting points adjacent to the axis of the head, substantially as set forth.

5. A cutter-head comprising a body, cutter-holders pivoted on journals around the axis of said body, each cutter-holder being formed to extend from its pivot across to the opposite side of the head, rocking cylinders mounted within journals of each cutter-holder and formed with eccentric bearings on their outer ends which engage with the swinging or outer ends of the adjacent cutter-holders for supporting and adjusting the same, spring plungers mounted in sockets in each cutter-holder and adapted to bear against the adjacent face of the cutter-holder which extends through the aperture therein to hold it outwardly against said eccentric bearing, and means for rocking and securing said cylinder to open and close the die, substantially as set forth.

6. A cutter-head comprising a body formed with projecting hollow journals arranged equi-distant around its axis, rocking cylinders mounted in said hollow journals, means connecting said several cylinders for securing and operating them simultaneously, eccentric bearings on the outer ends of said cylinders, cutter-holders pivoted on said bearings each cutter-holder being formed to extend across the head to a point adjacent to the eccentric bearing of the cylinder on the opposite side of the head, a bearing connection between said eccentric bearing and the outer end of said cutter-holder, a spring plunger mounted in a longitudinal socket in each cutter-holder and projecting to within the aperture therein to bear against the adjacent face of the cutter carried on said cutter-holder, and the cutter carried on the inner face of each cutter-holder, substantially as set forth.

7. A cutter-head comprising a body, cutter-holders pivoted on one side thereof and extending across the axis of the head to its opposite side, cutters carried on the inner face of each cutter-holder with their points adjacent to the axis of the head and means for securing said cutter-holders and means for adjusting said cutters to open and close the die, substantially as set forth.

8. A cutter-head comprising a body, cutter-holders pivoted around the axis on the face of said body, each cutter-holder extending across the axis of said head and through an aperture in the cutter-holder on the opposite side extending at right angles therewith, cutters on the inner faces of the outer ends of said cutter-holders, eccentric supports for the outer ends of said cutter-holders, spring-pressed plungers for forcing said outer ends into engagement with said eccentric supports and means for operating said eccentric supports to open and close the die, and means for securing the parts in fixed position, substantially as set forth.

9. A cutter-head comprising a body, cutter-holders on said body, cutters carried on said cutter-holders, means for adjusting and securing the parts, each of said cutter-holders being pivoted on one side of the axis of the head extending across said axis to the opposite side through an aperture in the cutter-holder mounted on said opposite side at right angles therewith, substantially as set forth.

10. A cutter-head comprising a body formed with stud-journals on its face arranged at equi-distant points around its axis, rocking cylinders mounted in perforations in said journals and formed with eccentric bearings on their outer ends with extreme outer ends concentric with the main body of the cylinders, means connected with the rear ends of said cylinders for securing them together, the cutter-holders pivoted on said stud-journals and the extreme outer ends of the rocking cylinders, each cutter-holder being provided with a bearing at its outer end adapted to engage with the eccentric bearing of the cylinder in the bearing of the opposite cutter-holder, substantially as set forth.

11. A cutter-head comprising a body, cutter-holders pivoted at one end on one side of said body and extending across the axis of the head at right angles with each other, rocking cylinders in the journal of each cutter-holder provided with an eccentric bearing adapted to engage with the outer end of the adjacent cutter-holder, and means for operating and securing said rocking cylinders, substantially as set forth.

12. A cutter-head comprising a cutter-holder, a cutter-carrying block mounted on said cutter-holder in tangential relation to a circle around the axis of the head, a cutter on said block, means for swinging and adjusting said block, and means for adjusting said cutter, substantially as set forth.

13. A cutter-head comprising a body, cutter-holders mounted on said body, blocks mounted on said cutter-holders, means for swinging and securing said blocks on lines tangent a circle around the axis of the head, cutters mounted on said blocks, and means for securing and adjusting said cutters, substantially as set forth.

14. A cutter-head comprising a body, cutter-holders pivoted around the axis of said body and extending from one side of the axis to the other, blocks mounted on said cutter-holders with their inner ends adjacent to the axis and their outer ends extending toward the free end of said cutter-holders, means for swinging the outer ends of said blocks on lines tangent to a circle around said axis, and the cutters mounted on said blocks, substantially as set forth.

In witness whereof, I, have hereunto set my hand and seal at Washington, District of Columbia this 30th day of April, A. D. nineteen hundred and ten.

ABRAHAM B. LANDIS. [L. S.]

Witnesses:
E. W. BRADFORD,
HARRY L. LANDIS.